3,142,578
ASPHALTIC EMULSION COMPOSITIONS
Gordon E. Hann, Novelty, and Albert Buehler, Cleveland, Ohio, assignors to The Tremco Manufacturing Company, Cleveland, Ohio, a corporation of Ohio
No Drawing. Filed Apr. 25, 1961, Ser. No. 105,274
10 Claims. (Cl. 106—277)

The present invention is directed to an improved coating composition made by mixing glass fibers and tough, wiry organic fibers, preferably hogs' hairs, with an asphaltic emulsion.

The coating of the present invention is particularly well suited for a maintenance coat over the final sealing coat for roofing material made by a plurality of built-up impregnated felt layers. In the roofing industry, generally a base sheet of dense pyrobitumen-impregnated felt is applied to the surface of the roof. A layer of molten pyrobitumen such as asphalt or coal tar is applied over the above described base sheet. Then, another layer of pyrobitumen-impregnated felt is rolled into the soft asphalt and the process repeated until a desired number of layers of felt have been applied. A final sealing coat of bitumen is mopped on the surface of the built-up layers.

As this roof system aged and weathered the top layer of bitumen checked and cracked as well as eroded away in some spots. This exposed the top layer of felt and maintenance became necessary.

Cut back bitumen coatings or bitumen emulsions were used to renew the surface. However, these systems were not satisfactory. One disadvantage is the fact that the cut back or emulsion films further checked and again exposed the top layer of felt.

In some cases a glass fabric was applied over the weathered surface and coats of cut back bitumen or bitumen emulsion were used to adhere, impregnate and seal over the glass to provide a protective surface.

The fabric material cannot follow the contour of the felt layer very closely nor fit into the cracks and crevices that occur in the weathered bitumen. Tiny voids and pinholes are formed which cause the top sealing layer to leak when exposed to the weather.

It is an object of the present invention to provide a composition adapted for coating base surfaces such as concrete or woven and felted fibrous materials with a tough waterproof film.

It is an object of the present invention to provide a composition adapted for use as the maintenance coat over the final sealing coat of a roofing material made of a plurality of felted layers, the maintenance coat being tough, waterproof and not subject to checking upon exposure to the weather.

It is an object of the present invention to provide a monolithic, tough, and pliable coating that will not shrink away from the intended base no matter how rough or irregular and will follow contours perfectly, the coating comprising relatively short glass fibers and relatively short organic fibers having the flexibility and the resiliency of hogs' bristles or hairs and the fibers bound and dispersed in a binder formed from an asphaltic emulsion.

It is an object of the present invention to provide a method of making an asphaltic composition adapted for coating base surfaces such as concrete or for coating and impregnating woven and felted fibrous materials with a tough waterproof film comprising mixing a combination of relatively short glass fibers and hogs' hair into an asphaltic emulsion.

The present invention provides an improved asphaltic composition adapted for application over woven and felted fibrous materials and particularly outstanding for use as a final sealing coating over roofing material made of built-up felt layers. The composition comprises about 92 to 99½ parts by weight of an asphaltic emulsion, about ¼ to 4 parts by weight of glass fibers in which each fiber has a length of about ⅛ to ¾ of an inch, and about ¼ to 4 parts by weight of organic fibers, each organic fiber having a length of about ⅛ to 1½ inches and having the toughness, flexibility and resiliency of hogs' bristles.

The above described coating can be applied easily and inexpensively over a felted layer by brushing, mopping, spraying, etc. without the problem of laying down a one-ply woven mat. Yet, the resultant coating is tough, waterproof and does not check when exposed to the weather and, thus, provides an outstanding final sealing coat for roofing material comprising built-up layers of asphalt-impregnated felt. The coating may also be applied over any suitable tight base sheet in multiple layers and preferably about 3 to 6 layers to form a flexible, waterproof upper sealing coat.

It has been found that the asphaltic emulsion alone, as well as asphalt or coal tar cut-backs alone, cannot be used as a final sealing coat. The resultant film checks and pinholes and other imperfections develop.

In accordance with the present invention, a combination of glass fibers and hogs' hairs, or other organic fibers having the toughness and flexibility of hogs' hairs, must be used with the asphaltic emulsion. Both the glass and the organic fibers should be relatively short, resistant to moisture, and resistant to decay. In addition, only a relatively small amount of the above described combination of fibers may be used to provide the tough, long lasting, waterproof film of the present invention.

The glass fibers that are suitable in the present invention may have a length of about ⅛ to ¾ of an inch, although glass fibers with an average length of ¼ to ⅜ inch should be used to provide the best sealing coat of the present invention. The above preferred lengths are also advantageous in providing pumpable mixture which can be transported by means of conventional pumps. Apparently the glass fibers also provide the dried emulsion with strength and body, and the above length of fibers are necessary to provide a composition that is easy to use and which has the physical properties when set to be useful as a final sealing coat.

The glass fibers, as is well known in the art, are available commercially in relatively thin diameters, and those having an average diameter of about 1/128 to 1/16 of an inch or, better, 1/64 to 1/32 of an inch are suitable for use in the composition of the present invention. It is preferred that the glass fibers comprise short bundles of about 150 to 250 individual filaments such as bundles obtained by chopping strands of continuous filaments bonded with chrome hard sizing or other suitable sizing such as silane, glue, polyester, etc. The preferred average filament diameter is about 0.00037 inch and the preferred number of filaments per strand is 204.

In the present invention, it is highly preferred that the organic fibers, which must be used with the above described glass fibers, be relatively short hogs' hairs or hogs' bristles. The term "hogs' hair" is intended to embrace hairs from domestic pigs, hogs, and sows and includes bristles obtained from wild pigs and hogs.

Surprisingly, the addition of hogs' hair to the combination of glass fibers and asphaltic emulsion ties in the glass fibers and dried asphaltic emulsion film to eliminate voids and eliminate the formation of pinholes that would allow water to leak through the film.

Unexpectedly, the use of the combination of hogs' hairs and glass fibers allows the whole fiber-filled emulsion system to cure more evenly and the resultant film or coating is definitely more water resistant throughout its entire area. In addition, the use of hogs' bristles insures even distribution of the glass.

The preferred hogs' bristles or hairs have an average length of about ½ to 1 inch, although, generally, bristles having lengths of about ⅛ to 1½ inches may be used in most applications to provide a tough waterproof coating that will not check even when exposed to outdoor weathering, and will lend flexibility and strength to provide good elongation of the final mass to withstand movement of the checks and the break is in the roofing material just below the final sealing coat.

Generally, the tough, wiry hogs' hairs have a diameter of substantially less than about $\frac{1}{64}$ inch, and preferably range from about $\frac{1}{256}$ to $\frac{1}{128}$ of an inch.

Apparently, the physical structure of the hogs' hair provides at least a part of the flexibility and strength of the resultant coating. The hogs' hairs have a curvature and each individual hair tapers from the butt end to a noticeably smaller diameter at the outer end. Apparently, this taper gives the hair snap and spring like a whip, the large end being more or less anchored because of its size and the other end movable because of its smaller size and lower modulus. In addition, the end of the hog bristle or hair has flag ends, the end being split into several finer hairs which tend to tie together with the flag ends of other hairs somewhat like a chain linkage which cannot be obtained by straight fibers or hairs. Also, the hogs' hair has an oval cross section, it being more flat than round and, thus, more easily bent in one direction; this ease of bending allows the hair to be positioned naturally during the brushing operation resulting in some springiness being built into the coating.

In addition to the above desirable physical properties, each hogs' hair has horny surfaces scales which helps the hairs to tie together better by not sliding freely over each other in as do smooth surfaced hairs or fibers.

While in some applications, say, where the climate does not have a great extreme of hot and cold temperatures and has a relatively low amount of rainfall, other tough resilient organic bristles can be substituted for the hogs' hairs; however, the other organic fibers should have the toughness, flexibility and resiliency of hogs' hairs, also the organic fibers should have an average length as previously described, namely, an average length of about ¼ to 1½ inches. However, it is preferred that, even when the final maintenance coat is not subjected to severe weathering; the other organic fibers such as crimped nylon or crimped rayon (or other crimped organic fibers that have a waviness in them to provide them with some resiliency), be used in amounts of only 50% of or preferably less than 33% of the amount of hogs' hairs usually used.

The following examples are included to illustrate the present invention and not to limit it in any way.

*Example 1*

A composition adapted for a maintenance coat over a final sealing coat for roofing material made of a plurality of felted layers was prepared from 97.6 parts by weight of an asphaltic emulsion, 1.2 parts by weight of glass fibers having an average length of ¼ to ⅜ inch, and 1.2 parts by weight of summer hogs' hairs, uncured and washed, and having lengths of ½ to 1½ inches. The glass fibers and hogs' hairs were stirred into the asphaltic emulsion to provide a stable storable composition The asphaltic emulsion used above was prepared by mixing about 40.6 parts by weight of water with about 55 parts by weight of a basic asphalt and 1.83 parts by weight of clay to form an asphalt-in-water emulsion.

The basic asphalt used in the emulsion has the following properties:

| | |
|---|---|
| Softening point, °F | 105–120 |
| Flash point, °F | 500+ |
| Penetration at 77° F | 100–120 |
| Ductility | 100+ |
| Loss-in-heating | 1 minus |
| Solubility in carbon disulfide | 99.5+ |
| Solubility in carbon tetrachloride | 99 |
| Ash content in benzol | 0.2 |

The above described glass fiber-hogs' hairs-asphaltic emulsion composition was applied by mopping over the final sealing coat of the top layer of the plurality of felted asphalt-impregnated layers. The final sealing coat had been exposed to the weather for two months and was checked. The resultant maintenance coating dried quickly and provided a tough, water-proof and corrosion resistant coating which did not check even when exposed to outdoor weathering.

A maintenance coat was mopped on the final sealing coat of the top layer of a plurality of asphalt-impregnated felted layers which formed a roofing material similar to the roofing material described above. The maintenance coat used was the above described asphaltic emulsion without the glass fibers and hogs' hairs.

The resultant coating, when dried, developed pinholes and checked badly. The coating was, thus, unsatisfactory for use as a maintenance coat for roofing material.

*Example 2*

A final sealing coat was prepared by mixing with an asphaltic emulsion about 3 parts by weight of hogs' hairs having an average length of about ½ to 1 inch and about 4 parts by weight of chopped glass strands with a chrome hard binder having an average length of about ¼ to ⅜ inch. The glass fibers were in the form of bundles of about 200 to 250 individual strands of a very tiny diameter. The diameter of each of the short strands was less than $\frac{1}{2500}$ of an inch. The amount of asphaltic emulsion used with the fibers was 93 parts by weight and asphaltic emulsion itself consisted of 50 parts by weight of water and 50 parts by weight of asphalt, the asphalt having the same basic composition as the asphalt described in Example 1, except that it was slightly harder, having a softening point of 120 to 135° F. and a penetration at 77° F. of 50 to 60.

The above coating material was applied as a final sealing membrane over roofing material made of four layers of asphalt-impregnated felt. The final sealing coat did not check, had good toughness and was waterproof.

A final sealing coat was made as described in this example except that no hogs' hairs were used.

The resultant coat did not disperse uniformly when applied as the final sealing layer. The glass fibers bunched up in scattered lumps through the area of the sealing layer. The resultant coat, thus, did not form a uniformly interwoven mat nor did it have the toughness necessary to withstand the movement in some cases. Further, pinholes developed in the sealing layer where there were no fibers.

In the above examples, other hogs' hairs or bristles from wild or domestic pigs, sows, or boars having the previously described suitable lengths and diameters can be substituted for all or part of the particular hogs' hairs used to provide similar results. Also in general, up to 50% of the hogs' hairs can be substituted for by suitable organic fibers such as crimped nylon fibers to produce nearly equivalent results, the resultant films being waterproof and tough, but not as resistant to checking as when hogs' hairs are used as all of the organic fiber content.

The glass fibers used in the above examples can be substituted for in whole or part by other glass fibers having lengths previously described as suitable to provide similar results.

In the above examples, other asphaltic emulsions can be used in place of the particular emulsion employed. Those providing similar results are emulsions in which the amount of water varies from about 35 to 55 parts by weight and the amount of asphalt preferably varies from about 45 to 65 parts by weight, although it is highly preferred that the asphalt content of the emulsion be about 50 to 60 parts by weight out of a total emulsion weight of 100 parts.

Also, in the above examples, other basic asphalt materials may be substituted for the particular asphaltic material used to make the above asphalt-in-water emulsions; the suitable asphaltic material preferably has a softening point of about 105 to 135° F., a flash point of at least about 500° F., a penetration of about 50 to 120 at 77° F., a ductility of at least about 100, and the asphalt is at least 99% by weight soluble in carbon disulfide and carbon tetrachloride.

While natural asphatic material is preferred for the most consistent results, other bituminous materials including asphaltic materials such as residual petroleum asphalt, air-blown petroleum asphalt, bitumen, and coal tar, etc. may be used as the asphaltic portion of the emulsion to provide similar results.

The clay used in the examples above described can be substituted for in whole or part by other clay materials, as is well known in the art, such as bentonite and colloidal clay to provide similar results, the clay being used as an emulsifying agent and to produce a static film on curing which will not flow, run and sag.

Thus, the term asphaltic emulsion used herein, is intended to embrace an asphaltic material such as natural asphalt, residual and blown petroleum asphalts and bitumen, which material is suspended in water by an emulsifying agent such as clay or bentonite, as is well known in the art.

Thus, while the coatings made from the composition of the present invention are relatively thin and generally range from only about 10 mils to 90 mils and preferably 30 to 70 mils in thickness; nevertheless, the coatings are tough, waterproof and resistent to checking.

What is claimed is:

1. A composition consisting essentially of about 92 to 99½ parts by weight of an asphaltic emulsion, about ¼ to 4 parts by weight of glass fibers in which each fiber has a length of about ⅛ to ¾ of an inch, and about ¼ to 4 parts by weight of organic fibers, each organic fiber having a length of about ⅛ to 1½ inches and having the toughness, flexibility and resiliency of hogs' hairs, each organic fiber selected from a member of the group consisting of hogs' hairs, a mixture of hogs' hairs and 0 to 50% by weight of the mixture of crimped nylon and a mixture of hogs's hairs and 0 to 50% by weight of the mixture of crimped rayon.

2. A composition consisting essentially of about 97 to 98 parts by weight of an asphaltic emulsion, about 1 to 1½ parts by weight of glass fibers in which each fiber has a length of about ⅛ to ¾ of an inch, and about 1 to 1½ parts by weight of hogs' hairs, each hogs' hair having a length of about ⅛ to 1½ inch.

3. A composition consisting essentially of about 97 to 98 parts by weight of an asphaltic emulsion, about 1 to 1½ parts by weight of glass fibers in which each fiber has a length of about ¼ to ⅜ of an inch, and about 1 to 1½ parts by weight of hogs' hairs in which each hogs' hair has a length of about ½ to 1 inch.

4. A compositon adapted for coating woven and felted fibrous materials in which the coating is tough, waterproof and does not check upon aging, the composition comprising about 92 to 99½% by weight of an asphaltic emulsion, about ¼ to 4% by wegiht of chopped glass fibers having an average length of about ¼ to ⅜ inches, and about ¼ to 4% by weight of hogs' hairs having an average length of about ½ to 1 inch.

5. A composition adapted for coating woven and felted fibrous materials in which the coating is tough, waterproof and does not check upon aging, the composition comprising (1) about 92 to 99½% by weight of an asphaltic emulsion containing about 30 to 50 parts by weight of water, about 45 to 65 parts by weight of asphalt, and about ½ to 5 parts by weight of clay, (2) about ¼ to 4% by weight of glass fibers having an average length of about ¼ to ⅜ inch, and (3) about ¼ to 4% by weight of hogs' hairs having an average length about ½ to 1 inch.

6. A composition adapted for coating woven and felted fibrous materials in which the coating is tough, waterproof and does not check upon aging, the composition comprising (1) about 92 to 99½% by weight of an asphaltic emulsion containing about 34 to 45 parts of water in which are dispersed about 50 to 60 parts by weight asphalt having a softening point of about 105 to 120° F., a flash point of at least about 500° F., a penetration of about 100 to 120 at 77° F., a ductility of at least about 100, and being at least 99% by weight soluble in carbon disulfide and carbon tetrachloride, (2) about ¼ to 4% by weight of chopped glass fibers having an average length of about ¼ to ⅜ inch, and (3) about ¼ to 4% by weight of hogs' hairs having an average length of about ½ to 1 inch.

7. A composition of matter consisting essentially of (1) about ¼ to 4 parts by weight of glass fibers having an average length of about ⅛ to ¾ of an inch, (2) about ¼ to 4 parts by weight of organic fibers having an average length of about ⅛ to 1½ inches and consisting essentially of a mixture of hogs' hairs and 0 to 50% by weight of the mixture of crimped nylon and (3) a binder in which said glass fibers and organic fibers are dispersed, the binder comprising a dried asphaltic emulsion.

8. A method of making an asphaltic composition adapted for coating woven and felted fibrous materials with a tough waterproof film comprising mixing about ½ to 5 parts by weight of an emulsifying agent and 45 to 65 parts by weight of asphalt in about 30 to 50 parts by weight of water to form an asphalt-in-water emulsion, and mixing with said emulsion about ¼ to 4 parts by weight of short glass fibers and about ¼ to 4 parts by weight of short organic fibers having the toughness, flexibility and resiliency of hogs' hairs and the fibers selected from a member of the group consisting of hogs' hairs, a mixture of hogs' hairs and 0 to 50% by weight of the mixture of crimped nylon and a mixture of hogs' hairs and 0 to 50% by weight of the mixture of crimped rayon.

9. A method of making an asphaltic composition adapted for coating woven and felted fibrous materials with a tough waterproof film comprising mixing about ½ to 5 parts by weight of an emulsifying agent and 45 to 65 parts by weight of asphalt in about 30 to 50 parts by weight of water to form an asphalt-in-water emulsion, and mixing with said emulsion about ¼ to 4 parts by weight of short glass fibers having an average length of about ⅛ to ¾ of an inch and about ¼ to 4 parts of hogs' hairs having an average length of about ⅛ to 1½ inch.

10. A composition consisting essentially of (1) about 1.2 parts by weight of glass fibers having an average length of about ⅛ to ¾ of an inch, (2) about 97.6 parts by weight of an asphaltic emulsion having a softening point of 105 to 120° F., a flash point of at least about 500° F., a penetration of about 100 to 120 at 77° F., and being at least 99% soluble in carbon disulfide and carbon tetrachloride, and (3) about 1.2 parts by weight of hogs' hairs having an average length of about ½ to 1½ inches.

References Cited in the file of this patent

UNITED STATES PATENTS

| | | |
|---|---|---|
| 1,156,122 | Woodley | Oct. 12, 1915 |
| 1,743,765 | Fischer | Jan. 14, 1930 |
| 2,331,365 | Abson | Oct. 12, 1943 |
| 2,733,159 | Scoggins et al. | Jan. 31, 1956 |